Aug. 11, 1959 — L. A. MEDLAR — 2,899,623
BATTERY HEAT MAINTAINER
Filed June 29, 1956
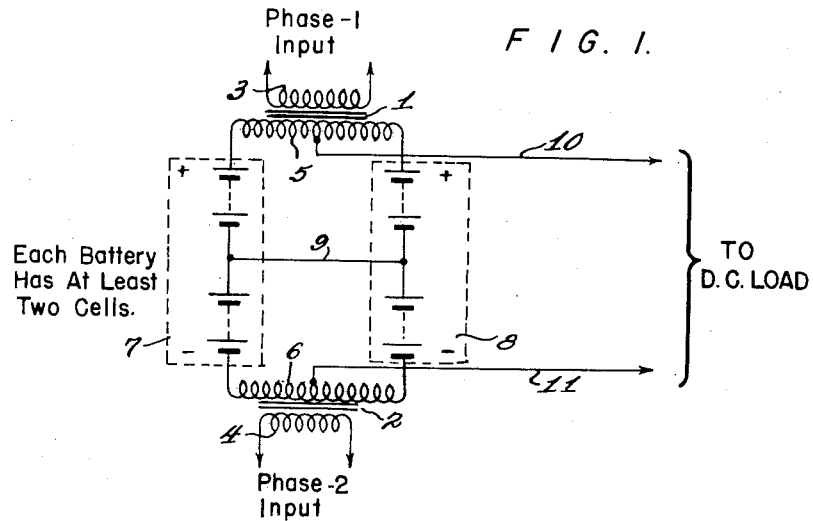
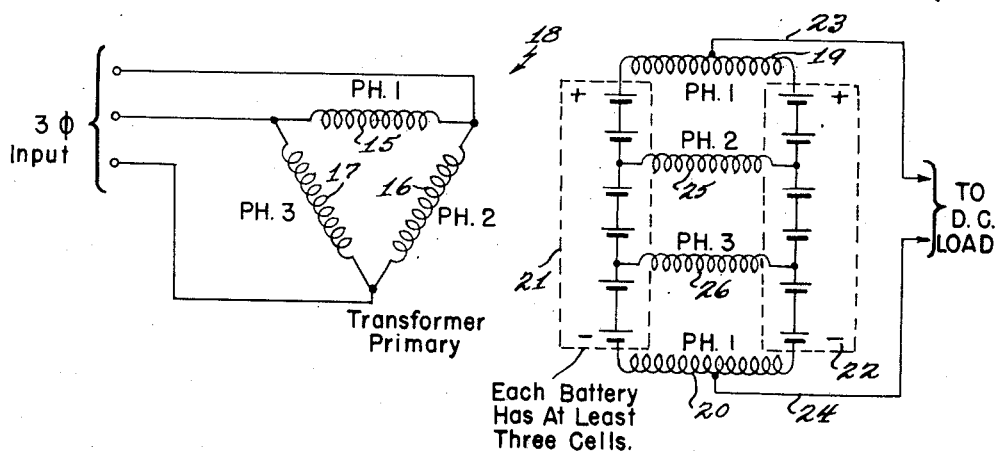
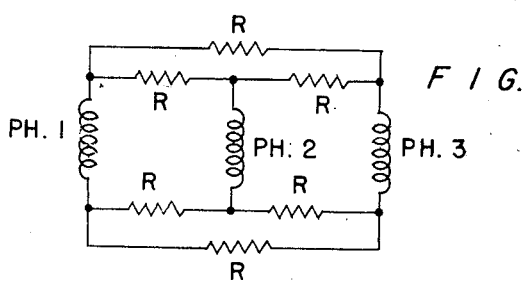
INVENTOR
LEWIS A. MEDLAR
BY Stone, Boyden & Mack,
ATTORNEYS United States Patent Office 2,899,623
Patented Aug. 11, 1959

2,899,623

BATTERY HEAT MAINTAINER

Lewis A. Medlar, Oreland, Pa., assignor to Fox Products Company, Philadelphia, Pa., a corporation of Pennsylvania Application June 29, 1956, Serial No. 594,988

6 Claims. (Cl. 320—2)

This invention relates to battery heaters, and, more particularly to apparatus for A.-C. heating of batteries without interference with the D.-C. circuits thereof.

In Patent No. 2,710,936, issued June 14, 1955, Lowry et al. disclose and claim a battery heat maintainer which derives an A.-C. heating current from a separate source. However, that apparatus was designed for single phase sources. For heavy duty automotive work such as large transport trucks, it has been proposed to charge the batteries from an A.-C. alternator and rectifier combination, and a plural phase alternator is the most economical for such a system.

It is the purpose of the apparatus of the invention to provide an A.-C. heat maintainer for batteries which will use the plural phase supply above referred to. However, it has been found that the mere insertion of the separate phase windings of the source into the circuits of the above patent does not yield satisfactory results. It is necessary that the parallel-connected batteries each have a number of cells at least as great as the number of phases of voltage supplied by the source, and, for avoidance of extreme unbalance of the loads on the various transformer secondaries, the batteries should be connected together between their outside terminals. As a matter of fact, for a perfectly balanced load, a pair of batteries heated from a two-phase source should have a connection between points spaced in potential equally from the outside terminals of the batteries, while a pair of batteries heated from a three phase source should have two connections from points on the batteries spaced equally in potential from each other and from the outside terminals. If the connected points were not of equal potential, a large circulatory current would flow through the circuit connecting them, perhaps large enough to burn out the transformer windings. It is extremely important to operation of the apparatus of this invention, therefore, that the connected points be of equal potential.

The apparatus of the invention, generally speaking, comprises a circuit for heating at least two batteries from a source of A.-C. voltage including at least one transformer for supplying voltages of at least two phases and including at least two secondary coils, one being connected between the positive terminals and one between the negative terminals of the batteries, with the load circuit connections to the midpoints of the coils, and a connection between the two batteries intermediate the outside terminals thereof. With this arrangement, the batteries buck each other in the A.-C. circuit, while alternating current does not flow in the load circuit.

The invention will now be described more particularly in accordance with preferred embodiments thereof, as shown in the attached drawing.

In the drawing,

Fig. 1 is a schematic diagram of a first species of the invention, using a two phase source of A.-C. voltage;

Fig. 2 is a schematic diagram of a second species of the invention, using a three phase source of A.-C. voltage; and, Fig. 3 is a schematic of the equivalent A.-C. circuit of Fig. 2.

In Fig. 1 a two phase source including a pair of transformers 1 and 2 having primary coils 3 and 4 and secondary coils 5 and 6 respectively, is shown. The primaries of the two transformers are connected to sources of voltage of two different phases (not shown). It is, of course, evident that a Scott-T connected primary supplied from a three phase source could be used in place of the two separate transformers of Fig. 1.

The opposite ends of secondary coil 5 are connected to the outside positive terminals of batteries 7 and 8, while the opposite ends of secondary coil 6 are connected to the outside negative terminals of the batteries. A conductor 9 joins points of the two batteries between their positive and negative outside terminals, and conductors 10 and 11 attached to the center taps of secondary coils 5 and 6, respectively, connect the batteries in parallel to the D.-C. load (not shown).

As indicated in Fig. 1, each of batteries 7 and 8 has at least two cells, so that conductor 9 can be connected to equal potential points between their outside terminals, to at least partially balance the loads on the secondaries. It is extremely beneficial if the batteries each have an even number of cells, in which case the conductor 9 would connect points spaced equally in potential from the two outside terminals of each battery. However, if batteries of odd numbers of cells, or if batteries which do not have terminals at their midpoints, are to be heated, the conductor 9 is connected to points of the two batteries as near as possible to the midpoints, but still of equal potential.

As was the case with the apparatus of the Lowrey et al. patent above referred to, the apparatus of this invention is designed to allow heating of the batteries while they are connected into a load circuit, by providing the batteries with an A.-C. heating current, while at the same time isolating the A.-C. and D.-C. circuits. It will be evident from Fig. 1 that the magneto-motive forces of the D.-C. load current from the parallel-connected batteries cancel in each secondary, while the A.-C. heating current heats the series-connected batteries but does not flow in the load circuit. It will also be evident that, if the conductor 9 is connected between midpoints of the batteries, the loads on secondaries 5 and 6 are perfectly balanced, since the two A.-C. circuits are effectively isolated.

Referring now to Fig. 2, the primary coils 15, 16 and 17 of a transformer 18 are connected in delta and supplied from a three phase A.-C. source (not shown). A pair of secondary coils 19 and 20 are wound on coil 15 so as to provide voltages of the first phase, and coil 19 is connected between the external positive terminals of batteries 21 and 22, while coil 20 is connected between the external negative terminals thereof. The center taps of coils 19 and 20 are connected through conductors 23 and 24, respectively, to a D.-C. load (not shown).

Batteries 21 and 22 each have at least three cells and are connected together between their external terminals by the secondary coils 25 and 26 of the second and third phases, corresponding to primary coils 16 and 17, respectively. The points of the batteries to which coils 25 and 26 are connected are preferably spaced as nearly as possible equally from each other and from the adjacent external terminals of the batteries, and of equal potential, and, to achieve perfect balance of the loads on the several secondaries, secondaries 25 and 26 are connected to points of potential spaced from the positive and the negative external terminals, respectively, by one-third of the full battery voltages. This latter, however, necessitates division of the batteries each into three equal numbers of cells. If the batteries do not each have a number of cells divisible by three, or if the proper outside connections are not available, the division of cells is made as close as possible to the indicated optimum, but still to points of equal potential.

Fig. 3 shows the equivalent A.-C. circuit for the secondary coils of Fig. 2, if the batteries each have a number of cells divisible by three and if the second and third phase secondary coils are connected between points spaced by one-third of the battery terminal voltages from the adjacent external terminals. In the circuit the resistances R, which indicate the A.-C. impedance of the cells between adjacent coils, are all equal, so the circuit is perfectly symmetrical and the loads on the three phases are all equal.

The apparatus of Fig. 2 performs the same function as that of Fig. 1, and that function need not be repeated here.

It is evident that many minor changes could be made in the apparatus shown in the drawings without departure from the spirit of the invention. For example any conventional source of three phase could be used, specifically including Y-connected transformer coils. Accordingly, the scope of the invention is not to be considered limited to the preferred embodiments shown, but only by the appended claims.

I claim:

1. In an apparatus of the type described, at least a pair of batteries, an A.-C. source comprising transformer means for supplying voltages of at least two phases and including at least two secondary coils, one of said secondary coils being connected between the outside negative terminals of said batteries and the other of said secondary coils being connected between the outside positive terminals of said batteries, a D.-C. load circuit having its first lead connected to the midpoint of said one coil and its second lead connected to the mid-point of said other coil, and means connecting said batteries together at substantially equal potential points between their outside terminals, said batteries each having a number of cells at least as great as the number of phases of voltage supplied by said secondary coils.

2. The apparatus of claim 1 in which said secondary coils supply voltages of two phases, and said means connecting the batteries is a conductor.

3. The apparatus of claim 2 in which said batteries each have an even number of cells and said conductor extends between points separated from both of said outside terminals of the batteries by one-half the number of cells of each battery.

4. The apparatus of claim 1 in which said secondary coils supply voltages of three phases, and said means connecting the batteries includes a first coil and a second coil supplying voltages of different phases each connected between equipotential points on the two batteries spaced apart potentially substantially equidistant from each other and the adjacent outside terminals of the batteries.

5. The apparatus of claim 4 in which said one and said other coils both supply voltages of the same phase.

6. The apparatus of claim 5 in which said batteries both have an equal number of cells evenly divisible by three and said first and second coils are respectively connected between points separated from the positive and negative outside terminals of the batteries by one third the total number of cells of each battery.

References Cited in the file of this patent

UNITED STATES PATENTS

| | | |
|---|---|---|
| 2,442,380 | Schrodt et al. | June 1, 1948 |
| 2,679,549 | Rezek et al. | May 25, 1954 |
| 2,689,322 | Godshalk et al. | Sept. 14, 1954 |
| 2,710,936 | Lowry et al. | June 14, 1955 |
| 2,710,937 | Godshalk et al. | June 14, 1955 |